United States Patent
Ham et al.

(10) Patent No.: US 11,233,385 B2
(45) Date of Patent: Jan. 25, 2022

(54) EARTH LEAKAGE BREAKER AND ARC DETECTION APPARATUS ATTACHABLE/DETACHABLE TO/FROM SAME EARTH LEAKAGE BREAKER

(71) Applicant: LS ELECTRIC CO., LTD., Anyang-si (KR)

(72) Inventors: Seungjin Ham, Anyang-si (KR); Kihwan Oh, Anyang-si (KR); Jinyoung Park, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 0 days.

(21) Appl. No.: 16/966,313

(22) PCT Filed: Nov. 21, 2018

(86) PCT No.: PCT/KR2018/014326
§ 371 (c)(1),
(2) Date: Jul. 30, 2020

(87) PCT Pub. No.: WO2019/172505
PCT Pub. Date: Sep. 12, 2019

(65) Prior Publication Data
US 2020/0373749 A1    Nov. 26, 2020

(30) Foreign Application Priority Data
Mar. 8, 2018  (KR) .......................... 10-2018-0027594

(51) Int. Cl.
*H02H 1/00* (2006.01)
*H02H 3/16* (2006.01)
(Continued)

(52) U.S. Cl.
CPC .......... *H02H 1/0015* (2013.01); *H01H 83/04* (2013.01); *H02H 3/167* (2013.01)

(58) Field of Classification Search
CPC ...... H02H 1/0015; H02H 3/167; H02H 3/162; H01H 83/02–04; H01H 2071/0278; H01H 71/128
See application file for complete search history.

(56) References Cited

U.S. PATENT DOCUMENTS

| 9,599,654 B2 * | 3/2017 | Park | H02H 3/105 |
| 9,608,432 B2 * | 3/2017 | Kim | G01R 31/52 |

(Continued)

FOREIGN PATENT DOCUMENTS

| JP | 2000197257 | * | 7/2000 |
| JP | 2000197257 A | | 7/2000 |

(Continued)

OTHER PUBLICATIONS

English translation of "JP 2000197257" Ground Fault Circuit Interrupter (Year: 2000).*

(Continued)

*Primary Examiner* — Sisay G Tiku
(74) *Attorney, Agent, or Firm* — K&L Gates LLP

(57) ABSTRACT

The present disclosure relates to an earth leakage breaker and an arc detection apparatus attachable/detachable to/from the earth leakage breaker. An earth leakage breaker and an arc detection apparatus according to one embodiment of the present disclosure comprise: a body of the earth leakage breaker; and an arc detection module attachably/detachably coupled to the body of the earth leakage breaker so as to detect an arc current, wherein the arc detection module comprises: an arc detection unit connected to a first load side terminal of the body of the earth leakage breaker so as to detect an arc current flowing through a line; a control unit for determining an arc current on the basis of an arc detection (Continued)

signal delivered by the arc detection unit; and an output unit for outputting a signal or a current, according to a control signal of the control unit.

9 Claims, 9 Drawing Sheets

(51) Int. Cl.
*H01H 83/02* (2006.01)
*H01H 83/04* (2006.01)
*H01H 71/04* (2006.01)
*H01H 71/12* (2006.01)

(56) References Cited

U.S. PATENT DOCUMENTS

| | | | |
|---|---|---|---|
| 10,410,816 B2* | 9/2019 | Chen | H02H 3/32 |
| 10,439,387 B2* | 10/2019 | Chen | H02H 3/331 |
| 10,594,131 B2* | 3/2020 | Chen | H02H 3/334 |
| 10,777,993 B2* | 9/2020 | Lee | G01R 19/16547 |
| 2004/0174173 A1* | 9/2004 | Elms | G01R 31/52 |
| | | | 324/509 |
| 2006/0195733 A1* | 8/2006 | DeHaven | G01R 31/52 |
| | | | 714/724 |
| 2008/0180195 A1* | 7/2008 | Nakano | H01H 71/0207 |
| | | | 335/7 |
| 2010/0324747 A1* | 12/2010 | Lee | H02H 3/33 |
| | | | 700/293 |
| 2015/0326003 A1* | 11/2015 | Yu | H02H 3/16 |
| | | | 361/42 |
| 2020/0217883 A1* | 7/2020 | Nam | H02H 3/04 |

FOREIGN PATENT DOCUMENTS

| | | |
|---|---|---|
| JP | 2009224285 A | 10/2009 |
| JP | 2012138263 A | 7/2012 |
| JP | 2013125635 A | 6/2013 |
| KR | 20060016458 A | 2/2006 |
| KR | 101227990 B1 | 2/2013 |
| KR | 20130101427 A | 9/2013 |
| KR | 20130119261 A | 10/2013 |
| KR | 101350231 B1 | 1/2014 |
| KR | 101513211 B1 | 4/2015 |
| KR | 101543224 B1 | 8/2015 |
| KR | 20160117919 A | 10/2016 |
| KR | 20170009349 A | 1/2017 |
| KR | 101728496 B1 | 4/2017 |

OTHER PUBLICATIONS

International Search Report for related International Application No. PCT/KR2018/014326; report dated Sep. 12, 2019; (5 pages).
Written Opinion for related International Application No. PCT/KR2018/014326; report dated Sep. 12, 2019; (3 pages).
Korean Office Action for related Korean Application No. 10-2018-0027594; action dated Jun. 15, 2020; (6 pages).
Search Report for related Korean Application No. 10-2018-0027594; report dated Jun. 21, 2018; (4 pages).
Japanese Office Action for related Japanese Application No. 2020-543582; action dated Aug. 31, 2021; (7 pages).

* cited by examiner

EARTH LEAKAGE BREAKER AND ARC DETECTION APPARATUS ATTACHABLE/DETACHABLE TO/FROM SAME EARTH LEAKAGE BREAKER

CROSS-REFERENCE TO RELATED APPLICATIONS

The present application is a National Stage of International Application No. PCT/KR2018/014326, filed on Nov. 21, 2018, which claims the benefit of earlier filing date and right of priority to Korean Application No. 10-2018-0027594 filed on Mar. 8, 2018, the contents of which are all hereby incorporated by reference herein in their entirety.

TECHNICAL FIELD

The present disclosure relates to an earth leakage breaker and an arc detection apparatus, and more particularly to an earth leakage breaker and an arc detection apparatus detachably coupled to the same.

BACKGROUND

In general, an earth leakage breaker is a machine that is installed in a distribution panel to prevent electric shock accidents or fire due to an electric leakage or various safety accidents due to overcurrent. That is, the earth leakage breaker detects an electric leakage occurring on a line and sends a trip signal to a trip coil so as to trip the breaker when the electric leakage exceeds a preset value.

An arc generated on a line has received attention as one of main factors causing fire, among accidents occurring on the line. This is because there are many cases where an arc occurs as a predisposing factor of electric fire, as a result of analyzing the cause of the electric fire.

The related art molded case/earth leakage circuit breaker may fast break a line when a fault current more than 100% of a rated current (typically, overcurrent is 150 to 500% of the rate current, and a short-circuit current (fault current) is 1,000% or more of the rated current) is flowing.

However, an arc current generated on a line with a load is usually within the rated current. When dividing the arc current into a series arc and a parallel arc, the series arc generated by load failure or defective contact flows through a load current, its magnitude is usually within a rated current range. Even when a short-circuit current (parallel arc) is generated due to a short, a predetermined amount of impedance is usually present on a shorted point. Thus, a short-circuit current lower than 1 kA flows. However, even a lower arc current may lead to fire if a flammable substance is present adjacent to the arc current.

As such, since an arc current in a low current region cannot be quickly cut off in the related art molded case/earth leakage circuit breaker, electric fire may occur.

Accordingly, a function of detecting such an arc and cutting off a line when an arc current occurs is implemented in an earth leakage breaker. A circuit breaker having an arc detection and blocking function is also referred to as an Arc Fault Circuit Interrupter (AFCI).

FIG. 1 is a block diagram illustrating an internal circuit of an arc/earth leakage circuit breaker 1 according to the related art.

The configuration of the arc/earth leakage breaker 1 according to the related art is as follows.

A breaking unit 3 is provided between a power source 11 and a load 2. The breaking unit 3 is operated by a trip coil 4.

A power supply unit (power circuit) 5 for supplying power to the trip coil 4, a control unit 8, and other internal components (elements) are provided. The power supply unit 5 may receive a voltage from the external power source 11 to supply to each component, namely, supply direct-current (DC) power to each component.

A leakage current detection unit 6 for detecting a leakage current is provided. The leakage current detection unit 6 is usually configured as a Zero Current Transformer (ZCT). An arc current detection unit 7 for detecting an arc current is provided. The arc current detection unit 7 is usually configured as a Current Transformer (CT).

In addition, the control unit 8 is provided to determine a leakage current and an arc current from a signal input from each detection unit 6 and 7. Typically, the control unit is configured as a Micro Control Unit (MCU) equipped with firmware.

In addition, a switch element 10 is provided to supply power or not to supply power to the trip coil 4 for breaking (tripping) the circuit breaker when a fault current (electric leakage or arc) occurs. The switch element 10 is configured as a semiconductor control element such as a Silicon Controlled Rectifier (SCR), a Field Effect Transistor (FET), or the like.

The short-circuit detection unit and the arc detection unit are integrally configured on a Printed Circuit Board (PCB) installed inside the circuit breaker.

The related art arc/earth leakage circuit breaker operates as follows.

The power supply unit 5 receives alternating-current (AC) power from the external power source 11 and supplies a DC voltage to operate the control unit 8 and other components and circuits.

The leakage current detection unit 6 senses a leakage current and transmits the sensed signal to the control unit 8, and the arc current detection unit 7 senses an arc current and transmits the sensed signal to the control unit 8.

The control unit 8 determines a size and authenticity of the leakage current/arc current by leakage current/arc current detection firmware (algorithm). If the current is determined as a fault current, the control unit 8 triggers (switches on) the switch element 10 for controlling the trip coil 4.

On the other hand, in order to confirm a normal operation of the circuit breaker, a test unit 9 is provided to determine whether the circuit breaker is operating normally by generating a simulated leakage/arc current on a test winding provided by at least one turn on the leakage current detection unit 6.

However, the leakage/arc detection unit or detector is very expensive and burdens a user. In addition, it is inefficient because the existing earth leakage breaker must be replaced entirely. Also, it is inconvenient because the arc detection function cannot be excluded, even if necessary after product installation. Further, there is a problem in that a volume (size) of the product is increased in order to implement both the earth leakage detection function and the arc detection function within a mechanism part of the breaker.

SUMMARY

The present disclosure has been invented to solve those problems and other drawbacks. One aspect of the present disclosure is to provide an arc detection apparatus, which is detachably coupled as an independent module having an arc detection function to an earth leakage breaker.

Another aspect of the present disclosure is to provide an arc detection apparatus, which can be applied to the existing earth leakage breaker without any change or by minimal change.

Another aspect of the present disclosure is to provide an arc detection apparatus that is inexpensive.

Another aspect of the present disclosure is to provide an arc detection apparatus, capable of selectively employing an arc detection function depending on user requirement, after being mounted to an earth leakage breaker.

An earth leakage breaker and an arc detection apparatus according to one embodiment of the present disclosure may comprise a body of the earth leakage breaker, and an arc detection module attachably/detachably coupled to the body of the earth leakage breaker so as to detect an arc current. The arc detection module may include an arc detection unit connected to a first load side terminal of the body of the earth leakage breaker so as to detect an arc current flowing through a line, a control unit for determining an arc current on the basis of an arc detection signal delivered by the arc detection unit, and an output unit for outputting a signal or a current, according to a control signal of the control unit.

Here, the body of the earth leakage breaker may include a breaking unit to open and close a line, and a trip coil to operate the breaking unit. The trip coil may operate according to the signal or current output from the output unit.

The arc detection module may be provided with a connection terminal disposed on one side thereof to be connected to the first load side terminal, and a second load side terminal disposed on another side thereof to connect the connection terminal and a load.

The arc detection module may further include a power supply unit to supply direct-current (DC) power to the control unit and the output unit.

The output unit may be provided with one output terminal connected to any one phase of the connection terminal, and another output terminal connected to another phase of a power source side terminal of the body of the earth leakage breaker.

The another output terminal of the output unit may be provided with an output resistor.

The body of the earth leakage breaker may be provided with a first test unit to generate a simulated leakage current for a leakage current detection function test, and the arc detection module may be provided with a second test unit to generate a simulated arc current for an arc current detection function test.

The arc detection module may be provided with a display unit connected to the control unit to display characteristics of electricity flowing on a line.

The body of the earth leakage breaker may have an enclosure provided with a first load side terminal hole through which the first load side terminal is exposed, and the arc detection module may have an enclosure provided with a coupling protrusion protruding therefrom to be fitted to the first load side terminal hole.

The body of the earth leakage breaker may have an enclosure provided with a test terminal hole through which a test terminal connected to the first test unit is exposed, and the arc detection module may have an enclosure provided with a terminal hole through which an output terminal of the output unit is exposed to be connected to the test terminal.

The body of the earth leakage breaker may have an enclosure provided with a switch terminal connected to a switch element for opening and closing a circuit connected to the trip coil, and the arc detection module may have an enclosure provided with a terminal hole through which an output terminal of the output unit is exposed to be connected to the switch element.

In an earth leakage breaker and an arc detection apparatus according to each embodiment of the present disclosure, a module which can be detachably coupled to the earth leakage breaker and has an arc detection function is independently provided, so as to be selectively applied to the earth leakage breaker.

This arc detection module can be applied without any change in the existing earth leakage breaker or by the minimum change such as configuring a terminal connecting portion.

In addition, since only the arc detection function is provided, it is cheaper than a circuit breaker that integrally has an electric leakage/arc detection function.

In addition, the arc detection function can be conveniently selectively used according to user requirement after mounted to the earth leakage breaker.

DETAILED DESCRIPTION

Hereinafter, preferred embodiments of the present disclosure will be described with reference to the accompanying drawings, so that a person skilled in the art can easily carry out the invention. It should be understood that the technical idea and scope of the present disclosure are not limited to those preferred embodiments.

Hereinafter, an earth leakage breaker and an arc detection apparatus in accordance with each embodiment of the present disclosure will be described in detail with reference to the accompanying drawings.

Figure 1:
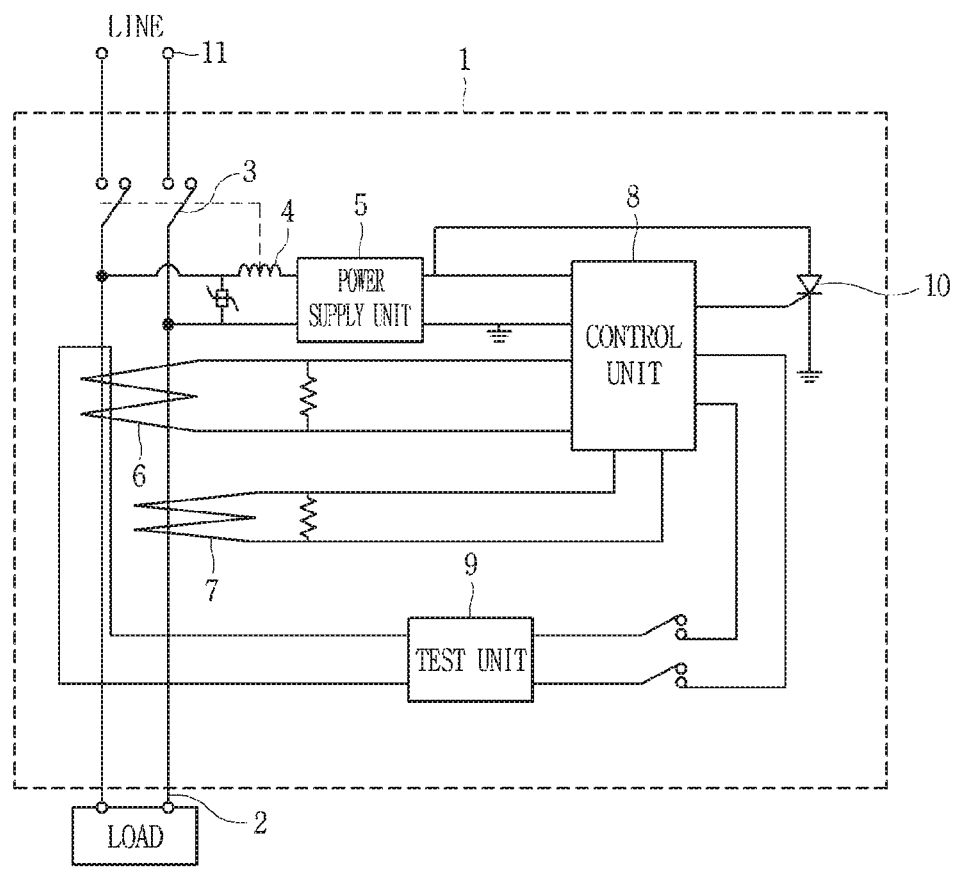
FIG. 1 is a block diagram illustrating an internal circuit of an arc/earth leakage breaker according to the related art.
Figure 2:
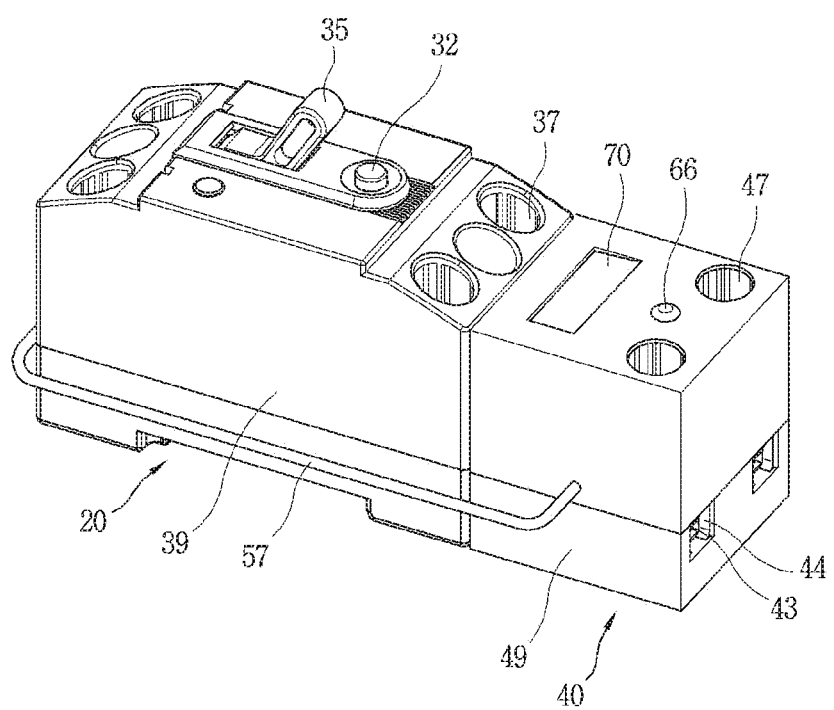
FIGS. 2 and 3 are perspective views of an earth leakage breaker and an arc detection apparatus in accordance with one embodiment of the present disclosure, which illustrate a coupled (attached) state and a separated (detached) state between the arc detection apparatus and the earth leakage breaker, respectively.
Figure 3:
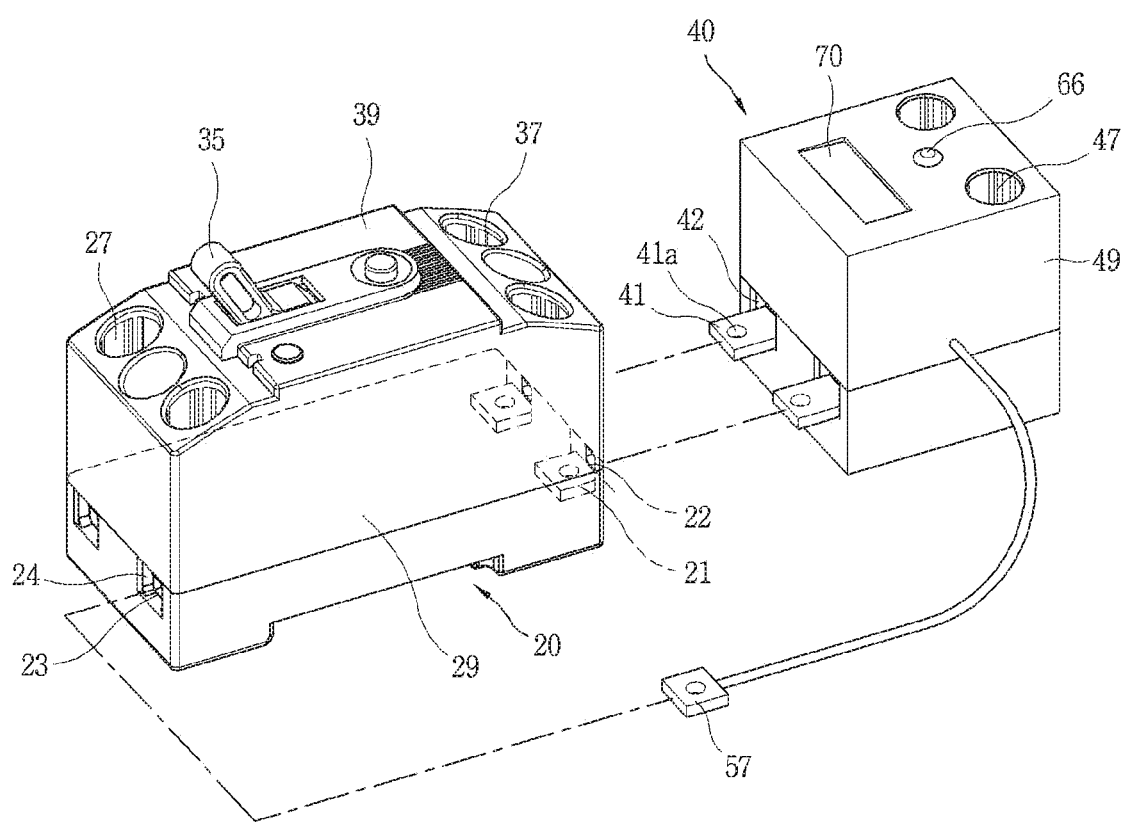
Figure 4:
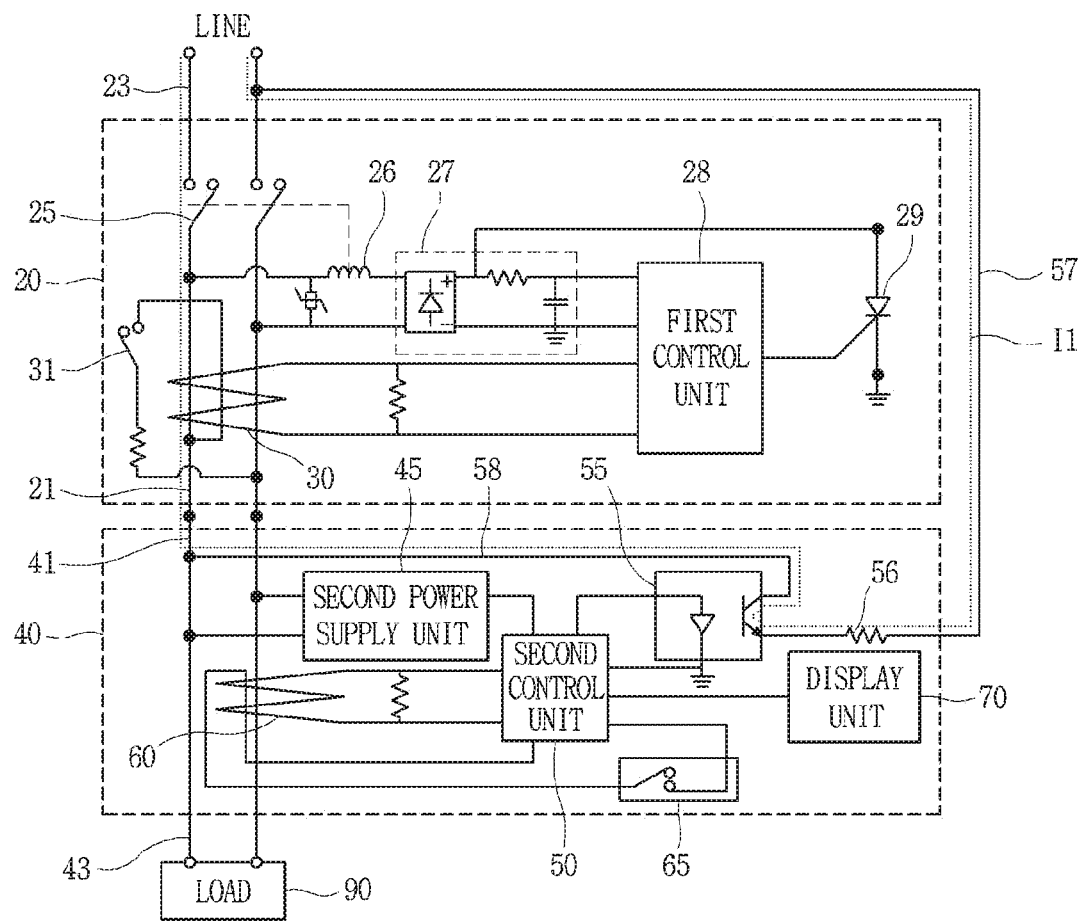
FIG. 4 is a block diagram illustrating an internal circuit of an earth leakage breaker and an arc detection apparatus according to the embodiment of FIG. 2.

FIGS. 2 and 3 are perspective views of an earth leakage breaker and an arc detection apparatus in accordance with one embodiment of the present disclosure. FIGS. 2 and 3 illustrates a coupled (attached) state and a separated (detached) state of the arc detection apparatus to and from the earth leakage breaker, respectively. Also, FIG. 4 is a block diagram illustrating an internal circuit of the earth leakage breaker and the arc detection apparatus according to the embodiment of FIG. 2.

An earth leakage breaker and an arc detection apparatus according to one embodiment of the present disclosure include an earth leakage breaker main body 20 provided with a breaking unit 25 for opening and closing a line and a trip coil 26 for operating the breaking unit 25, and an arc detection module 40 detachably coupled to the earth leakage breaker main body 20 to detect an arc current. The arc detection module 40 includes an arc detection unit 60 connected to a first load side terminal 21 of the earth leakage breaker main body 20, a second control unit 50 to determine an arc current according to an arc detection signal transmitted from the arc detection unit 60, and an output unit 55 to output a signal or current for operating the trip coil 26 according to a control signal of the second control unit 50.

The earth leakage breaker and the arc detection apparatus according to the one embodiment of the present disclosure are configured as the earth leakage breaker main body and the arc detection module (arc detection apparatus). Here, the earth leakage breaker will be referred to as the earth leakage breaker main body or simply a main body or body. In addition, when simply called a module, it refers to the arc detection module. On the other hand, to distinguish components, such as power supply units, commonly provided in the main body and the module, prefixes such as 'first' and 'second' may be used. At this time, 'first' may be applied to a component included in the main body, and 'second' may be used for a component applied to the module.

FIG. 2 illustrates a state where the main body 20 and the arc detection module 40 are coupled to each other, and FIG. 3 illustrates a state where the main body 20 and the arc detection module 40 are separated from each other.

The earth leakage breaker main body 20 and the arc detection module 40 have box-like enclosures 29 and 49, respectively.

The arc detection module 40 may be attached to or detached from the main body 20. Here, the arc detection module 40 is coupled to one side of the main body 20. For example, the arc detection module 40 may be coupled to a load side of the main body 20. Here, the main body 20 and the arc detection module 40 may be coupled in a manner that one surface of a load side of the first enclosure 39 and one surface of the second enclosure 49 of the arc detection module 40 come in contact with each other.

A connection terminal 41 of the arc detection module 40 is connected to the first load side terminal 21 of the main body 20. At this time, the connection terminal 41 of the arc detection module 40 is coupled to the first load side terminal 21 of the main body 20 by a coupling member (for example, a screw). To this end, the connection terminal 41 may be provided with a screw hole 41a. Such a screw assembly operation may be made through a first assembly hole 37 which is formed on an upper portion of the first load side terminal 21 of the main body 20.

In this way, the main body 20 and the arc detection module 40 may be coupled simply by coupling the first load side terminal 21 of the main body 20 and the connection terminal 41 of the arc detection module 40 to each other. In this case, the first load side terminal 21 of the main body 20 and the connection terminal 41 of the arc detection module 40 may serve even as a mechanical coupling function as well as an electric connection path between the main body 20 and the arc detection module 40. That is, the arc detection module 40 is not detached from the main body 20.

The first enclosure 39 of the main body 20 is provided with a power source side terminal hole 24 formed on a front surface (on a left side in the drawing), and a first load side terminal hole 22 on a rear surface. The first load side terminal 21 and a power source side terminal 23 are disposed in the first load side terminal hole 22 and the power source side terminal hole 24, respectively.

The second enclosure 49 of the arc detection module 40 is provided with a connection terminal hole 42 formed on a front surface so that the connection terminal 41 can be exposed therethrough, and a second load side terminal hole 44 formed on a rear surface so that a load 90 can be connected thereto.

The load 90 is connected to the second load side terminal 43. A second assembly hole 47 is formed on an upper portion of the arc detection module 40 to provide a working space for coupling the second load side terminal 43 and the load 90 to each other.

The description will be given additionally with reference to FIG. 3 which is the block diagram of the internal circuit.

The earth leakage breaker main body 20 includes a power source side terminal 23, a first load side terminal 21, a breaking unit 25, a first power supply unit 27, a first control unit 28, a switch element 29, an earth leakage detection unit 30, and the like.

A power source is connected to the power source side terminal 23 to supply current and voltage. At this time, AC power may be supplied. The power source side terminal 23 is provided in plurality. That is, the power source side terminals 23 are provided with respect to a plurality of lines or phases, respectively.

The breaking unit 25 is provided between the power source side terminal 23 and the first load side terminal 21. The breaking unit 25 is operated by an action of the trip coil 26 when an overcurrent, a fault current, and a leakage current is generated, thereby breaking a circuit (line). Although not illustrated in detail, the breaking unit 25 includes an opening/closing mechanism (not illustrated) operated by a user's manipulation applied to a handle 35 or an electromagnetic force generated in the trip coil 26, and a contact portion (not illustrated) connected to the terminals 21 and 23 to directly open or close a circuit (line).

The first power supply unit 27 is provided. The first power supply unit 27 receives external power from the power source side terminal 23 and supplies the received power to the first control unit 28 and other components and circuits. At this time, the first power supply unit 27 may convert AC power to DC power and provide the DC power to each element.

The first control unit 28 is provided. The first control unit 28 analyzes a signal received from the earth leakage detection unit 30 to determine whether a leakage current has been generated. This determination may be made by comparison with a preset reference voltage value. When it is determined that the leakage current has been generated, the first control unit 28 transmits a trip control signal to the switch element 29 to operate the trip coil 26.

The switch element 29 is provided. The switch element 29 may be configured as a semiconductor control element such as a silicon controlled rectifier (SCR) or a field effect transistor (FET). Accordingly, the switch element 29 is switched on/off.

The switch element 29 operates the trip coil 26 according to a trip command of the first control unit 28. Hereinafter, this will be described in detail.

A trip control signal transmitted from the first control unit 28 to the switch element 29 is provided as a gate driving signal of the switch element 29, and the switch element 29 is turned on in response to the trip control signal.

When the switch element 29 is turned on, a circuit configured along the first power supply unit 27, the trip coil 26, and the switch element 29 is closed, and a DC current supplied from the first power supply unit 27 flows to the trip coil 26 so that the trip coil 26 is magnetized. As the trip coil 26 is magnetized, the breaking unit 25 is triggered to be switched to a trip position.

The earth leakage detection unit 30 may be configured as a zero current transformer (ZCT). The earth leakage detection unit 30 senses a leakage current flowing on a circuit and inputs a signal to the first control unit 28. The ZCT is installed in a manner than each line penetrates through a center of a core. When an earth leakage occurs even on any one of the lines, the ZCT induces an induced voltage to a secondary coil wound on the core. Accordingly, an induced voltage signal is transferred to the first control unit 28 as an earth leakage detection signal. At this time, a sensitivity selection circuit is provided between the earth leakage detection unit 30 and the first control unit 28 to selectively transmit an earth leakage detection signal.

A first test unit 31 is provided to check whether a leakage detection function of the main body 20 is operating properly. The first test unit 31 is a circuit that generates and outputs a test signal, that is, a virtual earth leakage detection signal (a simulated leakage current). The first test unit 31 is also called an oscillation circuit.

The first test unit 31 is connected between a first test button 32 and the earth leakage detection unit 30 to generate a test signal when the first test button 32 is pressed. Responsive to this, the earth leakage detection unit 30 transmits a leakage detection signal to the first control unit 28. The first test button 32 of the first test unit 31 is exposed to outside of the main body 20 so that the user can easily operate it.

The arc detection module 40 includes a connection terminal 41, a second load side terminal 43, a second power supply unit 45, a second control unit 50, an output unit 55, an arc detection unit 60, and a second test unit 65, a display unit 70, and the like.

The connection terminal 41 and the second load side terminal 43 are configured as described above. The connection terminal 41 is connected to the first load side terminal 21 of the main body 20, and the second load side terminal 43 is connected to the load 90.

The second power supply unit 45 is provided. The second power supply unit 45 receives AC power and supplies the AC power to the second control unit 50 and other components and circuits in the arc detection module 40. At this time, the second power supply unit 45 may convert AC power to DC power and provide the DC power to each element.

The second control unit 50 is provided. The second control unit 50 analyzes a signal received from the earth leakage detection unit 60 to determine whether the signal indicates a true arc. This determination may be performed by comparison with a preset reference value or a preset waveform. The second control unit 50 transmits a trip control signal to the output unit 55 to operate the trip coil 26 of the main body 20 when it is determined that a signal value received from the arc detection unit 60 is a true arc.

The output unit 55 is provided. The output unit 55 may be configured as a semiconductor control element or a switch element. The output unit 55 has an input line and an output line. The output unit 55 may be configured as an element such as a photocoupler, SCR, FET, or the like. The output unit 55 receives a trip control signal from the second control unit 50 and outputs it to the main body 20. The output unit 55 generates an output signal or send an output current for operating the trip coil 26 of the main body 20 according to the trip control signal of the second control unit 50.

The output signal of the output unit 55 may be sent to the power source side terminal 23 of the main body 20, the switch element 29, or the first test unit 31 to operate the trip coil 26. First, this embodiment corresponds to the case where the output unit 55 is connected to the power source side terminal 23 of the main body 20.

An anode of the output unit 55 is connected to any one phase (for example, any one phase of phases of the connection terminal) inside the arc detection module 40, and a cathode is connected to another phase of the power source side terminal 23 of the main body through an output line or an output terminal 57. When the output unit 55 is turned on according to a trip signal of the second control unit 50, the second power supply unit 45, the output unit 55, and the power source side terminal 23 of the main body 20 are closed such that a current I1 flows along them. Since the earth leakage detection unit 30 of the earth leakage breaker main body 20 detects the current as a leakage current, the trip coil 26 is operated to break the circuit.

Here, an output resistor 56 may be provided at the cathode of the output unit 55 to generate current or divide voltage. Accordingly, a leakage current amount can be set.

In this embodiment, a current is made to flow on a circuit of the main body 20 from the output unit 55. The main body 20 determines this as a leakage current is flowing and thus operates the breaking unit 25.

The arc detection unit 60 detects an arc current flowing on a circuit and inputs a signal to the second control unit 50. The arc detection unit 60 may be configured as a current transformer CT installed on one phase of the circuit. The arc detection unit 60 senses an arc current flowing on a circuit and inputs a signal to the second control unit 50. The CT is installed on one line of a circuit. When an arc current is generated, the CT induces an induced voltage to a secondary coil wound on a core. Accordingly, an induced voltage signal is transferred to the second control unit 50 as an arc detection signal. At this time, a sensitivity selection circuit is provided between the arc detection unit 60 and the second control unit 50 to selectively transmit the arc detection signal.

A second test unit 65 is provided to check whether the arc detection function of the main body 20 is operating properly. The second test unit 65 is a circuit that generates and outputs a test signal, that is, a virtual arc detection signal (a simulated arc current).

The second test unit 65 is connected between a second test button 66 and the arc detection unit 60 to generate a test signal when the second test button 66 is pressed. Responsive to this, the arc detection unit 60 transmits an arc detection signal to the second control unit 50. The second test button 66 of the second test unit 65 is exposed to outside of the arc detection module 40 so that the user can easily operate it.

The output unit 55 of the arc detection module 40 is connected to the power source side terminal 23 of the main body 20. The arc detection module 40 operates in such a way that a simulated leakage current is applied to the main body 20 through the output unit 55 when an arc signal is generated. Accordingly, the main body 20 recognizes it as a leakage current has been generated and operates the breaking unit 25.

The display unit 70 indicates a state of the arc detection module 40. The display unit 70 is exposed to the second enclosure 49. The display unit 70 may be configured as an LCD display, an LED display, and the like. Various information on electricity may be displayed on the display unit 70. This information includes current, voltage, power factor, amount of power, power quality, whether or not an arc has been generated, and the like. This state may be selectively displayed by the second control unit 50.

In addition, this display form may include an alarm or an alert function. The alarm or alert function may be provided using sounds. In this case, the display unit 70 may include a sound generating element or a speaker.

If the output terminal 57 connected to the power source side terminal 23 is removed from this embodiment, the arc detection module 40 merely detects an arc and performs only a function of displaying and notifying the detection of the arc.

In the arc detection apparatus according to the one embodiment of the present disclosure, since the connection terminal of the arc detection module is connected to the load side terminal of the main body, and the output terminal is connected to one phase of the power source side terminals of the main body, thereby facilitating a coupling operation. This may result in facilitating attachment and detachment between the main body 20 and the arc detection module 40.

Figure 5:
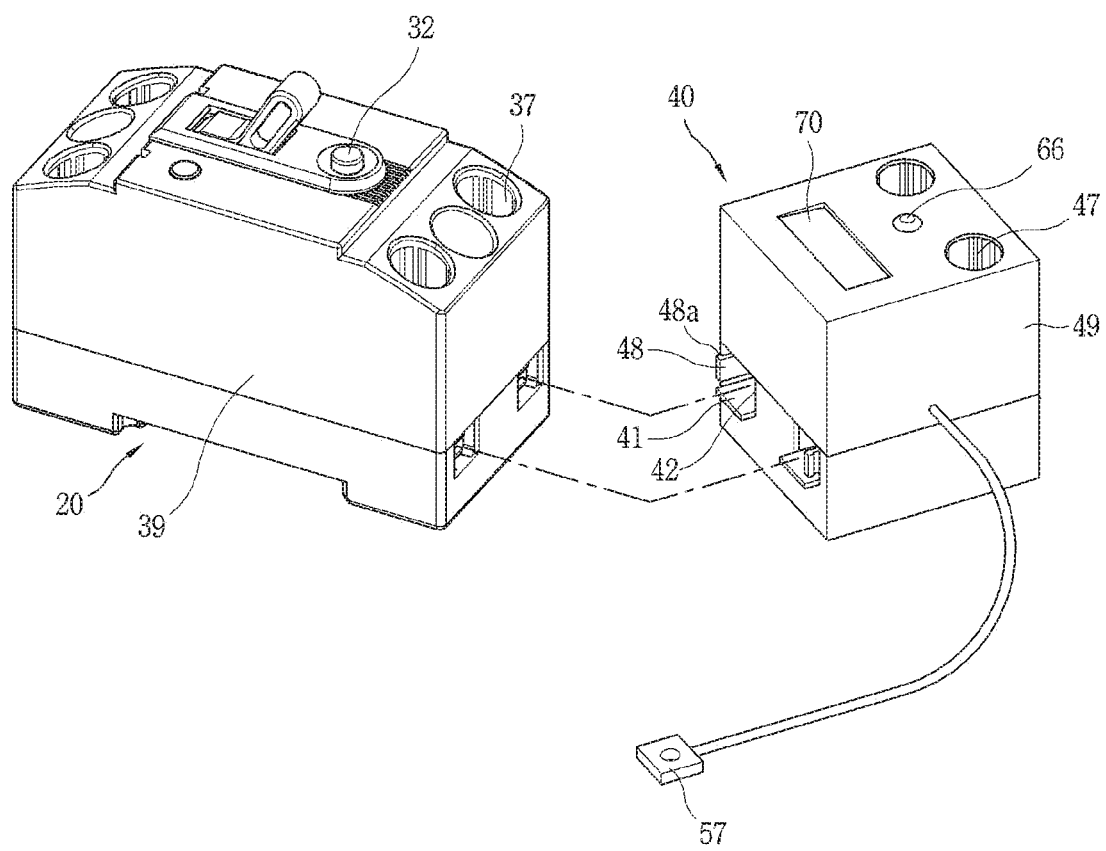
FIG. 5 is a perspective view of an earth leakage breaker and an arc detection apparatus in accordance with another embodiment of the present disclosure.

FIG. 5 illustrates another embodiment of the arc detection module 40. In this embodiment, each connection terminal hole 42 is provided with at least one coupling protrusion 48. Accordingly, the arc detection module 40 is fitted to the main body 20. The coupling protrusion 48 of the arc detection module 40 is inserted into the first load side terminal home 22 of the main body 20. Accordingly, the coupling force between the main body 20 and the arc detection unit 60 is enhanced. In addition, since the connection is not made by the connection between the terminals, the terminals do not need to have mechanical support, so that stable current flow is maintained.

Here, the coupling protrusion 48 is preferably made of synthetic resin or the like to have predetermined elasticity. Accordingly, press-fitting is allowed. The coupling protrusion 48 is provided with a stopping portion 48a, which may prevent the coupling protrusion 48 from being randomly separated from the first load side terminal hole 22 of the main body 20 after fitted.

Figure 6:
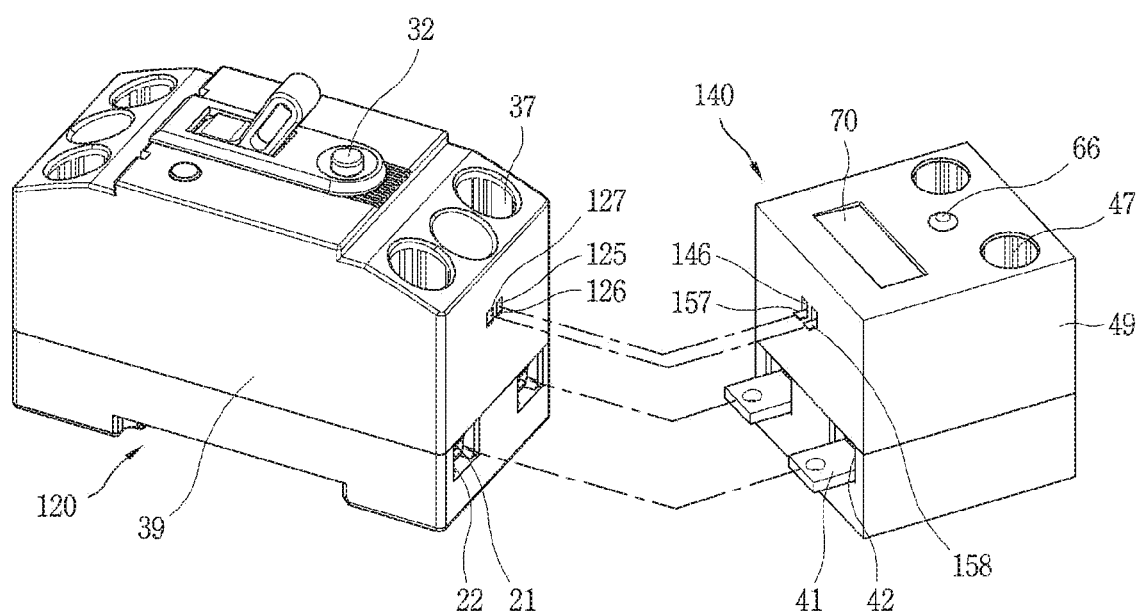
FIGS. 6 and 7 are a perspective view and a block diagram of an internal circuit, respectively, illustrating an earth leakage breaker and an arc detection apparatus in accordance with another embodiment of the present disclosure.
Figure 7:
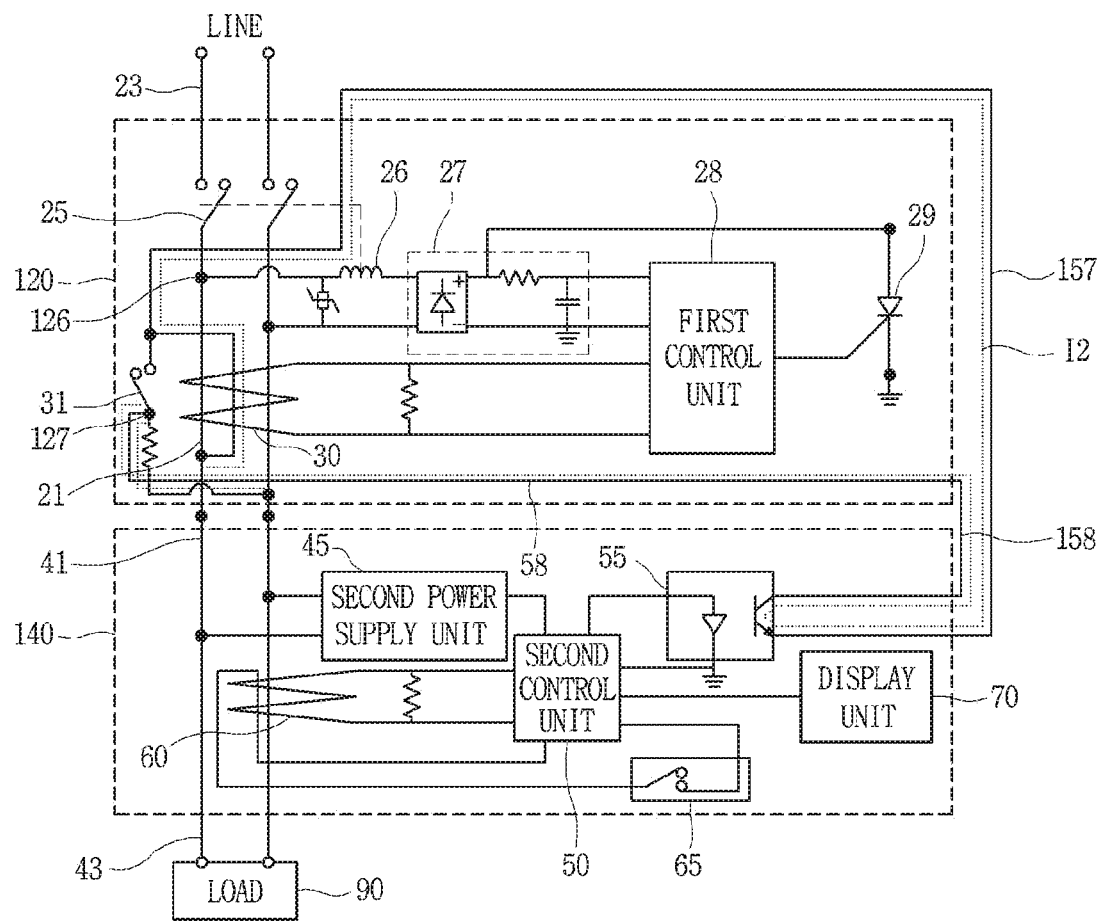

FIGS. 6 and 7 are a perspective view and a block diagram of an internal circuit of an arc detection module 140 in accordance with another embodiment of the present disclosure.

A detailed description of the basic configuration of the main body 120 and the arc detection module 140 will be omitted if it is the same as that of the previous embodiment, and only different parts will be mainly described.

An earth leakage breaker main body 120 includes a power source side terminal 23, a first load side terminal 21, a breaking unit 25, a first power supply unit 27, a first control unit 28, a switch element 29, an earth leakage detection unit 30, and the like.

A plurality of test terminal holes 125 is provided on a part of an enclosure 39 of a main body 120. The test terminal holes 125 may be formed above a first load side terminal hole 22. Test terminals 126 and 127 are disposed in the test terminal holes 125, respectively. Here, the test terminals 126 and 127 are terminals connected to both ends of a contact (switch) of a first test unit 31. Due to the structure that the test terminals 126 and 127 are connected to the first test unit 31, when an input (current) is applied to the test terminals 126 and 127, a result of operating a first test button 32 of the main body 20 is obtained.

A plurality of terminal holes 146 is formed on an enclosure 49 of an arc detection module 140. The terminal holes 146 may be formed above connection terminal holes 42. Output terminals 157 and 158 are disposed in the terminal holes 146, respectively. Here, the terminal holes 146 and the output terminals 157 and 158 of the arc detection module 140 correspond to the test terminal holes 125 and the test terminals 126 and 127 of the main body 120, respectively. Thus, when the arc detection module 140 is coupled to the main body 120, the output terminals 157 and 158 are automatically connected to the test terminals 126 and 127.

The arc detection module 140 includes a connection terminal 41, a second load side terminal 43, a second power supply unit 45, a second control unit 50, an output unit 55, an arc detection unit 60, and a second test unit 65, a display unit 70, and the like. An individual description for each component will be omitted if it is the same as that of the previous embodiment.

The output unit 55 is provided. The output terminals 157 and 158 of the output unit 55 are connected to the test terminals 126 and 127 of the main body 120, respectively. In one example, the cathode output terminal 157 of the output unit 55 is connected to the test terminal 126 of one phase of the test unit 31 of the main body 120, and the anode output terminal 158 of the output unit 55 is connected to the test terminal 127 of another phase of the test unit 31 of the main body 120. Therefore, when an output signal is generated in the output unit 55, it has the same effect as operating the first test button 32 of the main body 120.

When the arc detection module 140 detects an arc and the output unit 55 sends an output signal, the second power supply unit 45, the output unit 55, and the first test unit 65 are closed so that a current I2 flows. The main body 120 then determines it as a leakage current is flowing. Accordingly, the trip coil 26 is magnetized by a current applied thereto according to a command of the first control unit 28. Responsive to this, the breaking unit 25 is operated and a circuit is broken.

Figure 8:
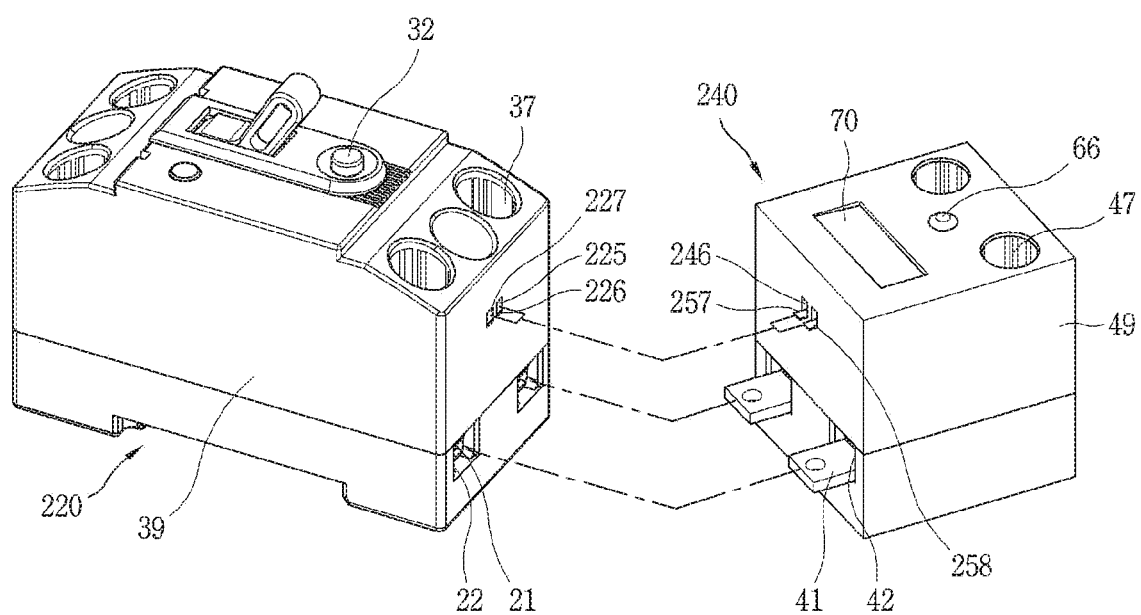
FIGS. 8 and 9 are a perspective view and a block diagram of an internal circuit, respectively, illustrating an earth leakage breaker and an arc detection apparatus in accordance with another embodiment of the present disclosure.
Figure 9:
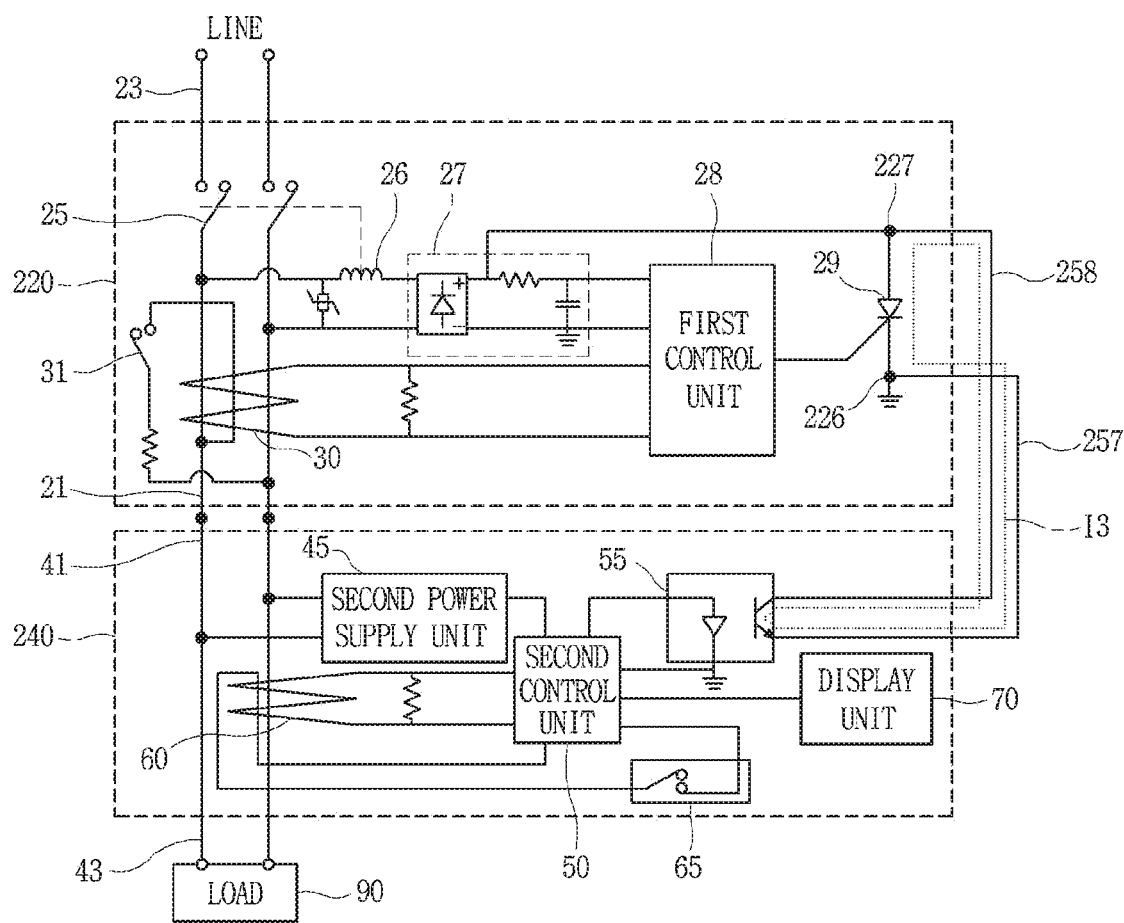

FIGS. 8 and 9 are a perspective view and a block diagram of an internal circuit of an earth leakage breaker main body 240 and an arc detection module 220 in accordance with another embodiment of the present disclosure.

A detailed description of the basic configuration of the main body 220 and the arc detection module 240 will be omitted if it is the same as that of the previous embodiments.

An earth leakage breaker main body 220 includes a power source side terminal 23, a first load side terminal 21, a breaking unit 25, a first power supply unit 27, a first control unit 28, a switch element 29, an earth leakage detection unit 30, and the like.

Switch terminal holes 225 are formed on a part of an enclosure 39 of a main body 220. The switch terminal holes 225 may be formed above a first load side terminal hole 22. Switch terminals 226 and 227 are disposed in the switch terminal holes 225, respectively. Here, the switch terminals 226 and 227 are terminals connected to both ends of the switch element 29, respectively. Since the switch terminals 126 and 127 are connected to the switch element 29, when an input (current) is applied to the switch terminals 126 and 127, a result of operating the switch element 29 of the main body 20 is obtained.

Terminal holes 246 are formed on an enclosure 49 of an arc detection module 240. The terminal holes 246 may be formed above connection terminal holes 42. Output terminals 257 and 258 are disposed in the terminal holes 246, respectively. Here, the terminal holes 246 and the output terminals 257 and 258 of the arc detection module 240 correspond to the switch terminal holes 225 and the switch terminals 226 and 227 of the main body 220, respectively. Thus, when the arc detection module 240 is coupled to the main body 220, the output terminals 257 and 258 are automatically connected to the switch terminals 226 and 227.

The arc detection module 240 includes a connection terminal 41, a second load side terminal 43, a second power supply unit 45, a second control unit 50, an output unit 55, an arc detection unit 60, and a second test unit 65, a display unit 70, and the like. An individual description for each component will be omitted if it is the same as that of the previous embodiments.

The output unit 55 is provided. An anode and a cathode of the output unit 55 are connected to an anode and a cathode of a switch element 29, respectively. That is, the cathode output terminal 257 of the output unit 55 is connected to the cathode switch terminal 226 of the main body 220, and the anode output terminal 258 of the output unit 55 is connected to the anode switch terminal 227 of the main body 220. Therefore, when an output signal is generated in the output unit 55, it has the same effect as switching on the switch element 29 of the main body 120. Accordingly, the trip coil 26 is operated in the main body 20.

When the arc detection module 240 detects an arc and the output unit 55 transmits an output signal, the second power supply unit 45, the output unit 55, and the switch element 29 are closed so that a current I3 flows. Accordingly, the trip coil 26 is magnetized in the main body 220 by a current applied thereto. Responsive to this, the breaking unit 25 is operated and a circuit is broken.

In this embodiment, since a simulated leakage current is not generated or an operation is carried out without use of the first test unit, unlike the previous embodiments, a leakage current determination process is omitted and the switch element is directly operated, thereby allowing a fast operation.

In an earth leakage breaker and an arc detection apparatus according to each embodiment of the present disclosure, a module which can be detachably coupled to the earth leakage breaker and has an arc detection function is independently provided, so as to be selectively applied to the earth leakage breaker.

This arc detection module can be applied without any change in the existing earth leakage breaker or by the minimum change such as configuring a terminal connecting portion.

In addition, since only the arc detection function is equipped, it is cheaper than a circuit breaker that integrally has an electric leakage/arc detection function.

In addition, the arc detection function can be conveniently selectively used according to user requirement after mounted to the earth leakage breaker.

While the invention has been shown and described with reference to the foregoing preferred embodiments thereof, it will be understood by those skilled in the art that various changes and modifications may be made without departing from the spirit and scope of the invention as defined by the appended claims. Therefore, the embodiments disclosed in the present disclosure are not intended to limit the scope of the present disclosure but are merely illustrative, and it should be understood that the scope of the technical idea of the present disclosure is not limited by those embodiments. That is, the scope of protection of the present disclosure should be construed according to the appended claims, and all technical ideas within the scope of equivalents thereof should be construed as being included in the scope of the present disclosure.

The invention claimed is:

1. An earth leakage breaker and an arc detection apparatus, comprising:
a body of the earth leakage breaker; and
an arc detection module detachably coupled to the body of the earth leakage breaker so as to detect an arc current, wherein the arc detection module comprises:
an arc detection unit connected to a first load side terminal of the body of the earth leakage breaker so as to detect the arc current flowing through a line;
a control unit for determining the arc current on a basis of an arc detection signal delivered by the arc detection unit; and
an output unit for outputting a signal or a current, according to a control signal of the control unit,
wherein the arc detection module is provided with a connection terminal disposed on one side thereof to be connected to the first load side terminal, and a second load side terminal disposed on another side thereof to connect the connection terminal and a load, and
wherein the output unit is provided with one output terminal connected to any one phase of the connection terminal, and another output terminal connected to another phase of a power source side terminal of the body of the earth leakage breaker.

2. The earth leakage breaker and the arc detection apparatus of claim 1, wherein the body of the earth leakage breaker comprises a breaking unit to open and close the line, and a trip coil to operate the breaking unit, wherein the trip coil operates according to the signal or current output from the output unit.

3. The earth leakage breaker and the arc detection apparatus of claim 2, wherein the body of the earth leakage breaker is provided with a switch terminal hole through with a switch terminal connected to a switch element for opening and closing a circuit connected to the trip coil, and the arc detection module is provided with a terminal hole through which at least one of the one output terminal and the another output terminal of the output unit is exposed to be connected to the switch element.

4. The earth leakage breaker and the arc detection apparatus of claim 1, wherein the arc detection module further comprises a power supply unit to supply direct-current (DC) power to the control unit and the output unit.

5. The earth leakage breaker and the arc detection apparatus of claim 1, wherein the another output terminal of the output unit is provided with an output resistor.

6. The earth leakage breaker and the arc detection apparatus of claim 1, wherein the body of the earth leakage breaker is provided with a first test unit to generate a simulated leakage current for a leakage current detection function test, and the arc detection module is provided with a second test unit to generate a simulated arc current for an arc current detection function test.

7. The earth leakage breaker and the arc detection apparatus of claim 6, wherein the body of the earth leakage breaker is provided with a test terminal hole through which a test terminal connected to the first test unit is exposed, and the arc detection module is provided with a terminal hole through which at least one of the one output terminal and the another output terminal of the output unit is exposed to be connected to the test terminal.

8. The earth leakage breaker and the arc detection apparatus of claim 1, wherein the arc detection module is provided with a display unit connected to the control unit to display characteristics of electricity flowing on the line.

9. The earth leakage breaker and the arc detection apparatus of claim 1, wherein the body of the earth leakage breaker is provided with a first load side terminal hole through which the first load side terminal is exposed, and the arc detection module is provided with a coupling protrusion protruding therefrom to be fitted to the first load side terminal hole.

* * * * *